No. 813,259. PATENTED FEB. 20, 1906.
R. E. VAN COURT.
BAND CUTTER AND FEEDER.
APPLICATION FILED JUNE 22, 1904.
2 SHEETS—SHEET 1.

No. 813,259. PATENTED FEB. 20, 1906.
R. E. VAN COURT.
BAND CUTTER AND FEEDER.
APPLICATION FILED JUNE 22, 1904.

2 SHEETS—SHEET 2.

Witnesses

Inventor
R. E. Van Court.
By Victor J. Evans
Attorney

UNITED STATES PATENT OFFICE.

ROBERT E. VAN COURT, OF NEWTON, IOWA.

BAND-CUTTER AND FEEDER.

No. 813,259.     Specification of Letters Patent.     Patented Feb. 20, 1906.

Application filed June 22, 1904. Serial No. 213,707.

*To all whom it may concern:*

Be it known that I, ROBERT E. VAN COURT, a citizen of the United States, residing at Newton, in the county of Jasper and State of Iowa, have invented new and useful Improvements in Band-Cutters and Feeders, of which the following is a specification.

This invention relates to band-cutters and feeders, the object of the invention being to provide a device of the character described embodying mechanism for carrying bundles of grain inward to the threshing mechanism of the machine, means for straightening the bundles as they are carried inward, means for cutting or severing the bands of the bundles, and means for spreading the bundles after the bands thereof have been cut or severed in order to present the grain in a loosened and spread-out condition as it is delivered to and acted upon by the threshing-cylinder and concave.

With the above general objects in view and others, the nature of which will more fully appear as the description proceeds, the invention consists in the novel construction, combination, and arrangement of parts, as herein fully described, illustrated, and claimed.

Figure 1:
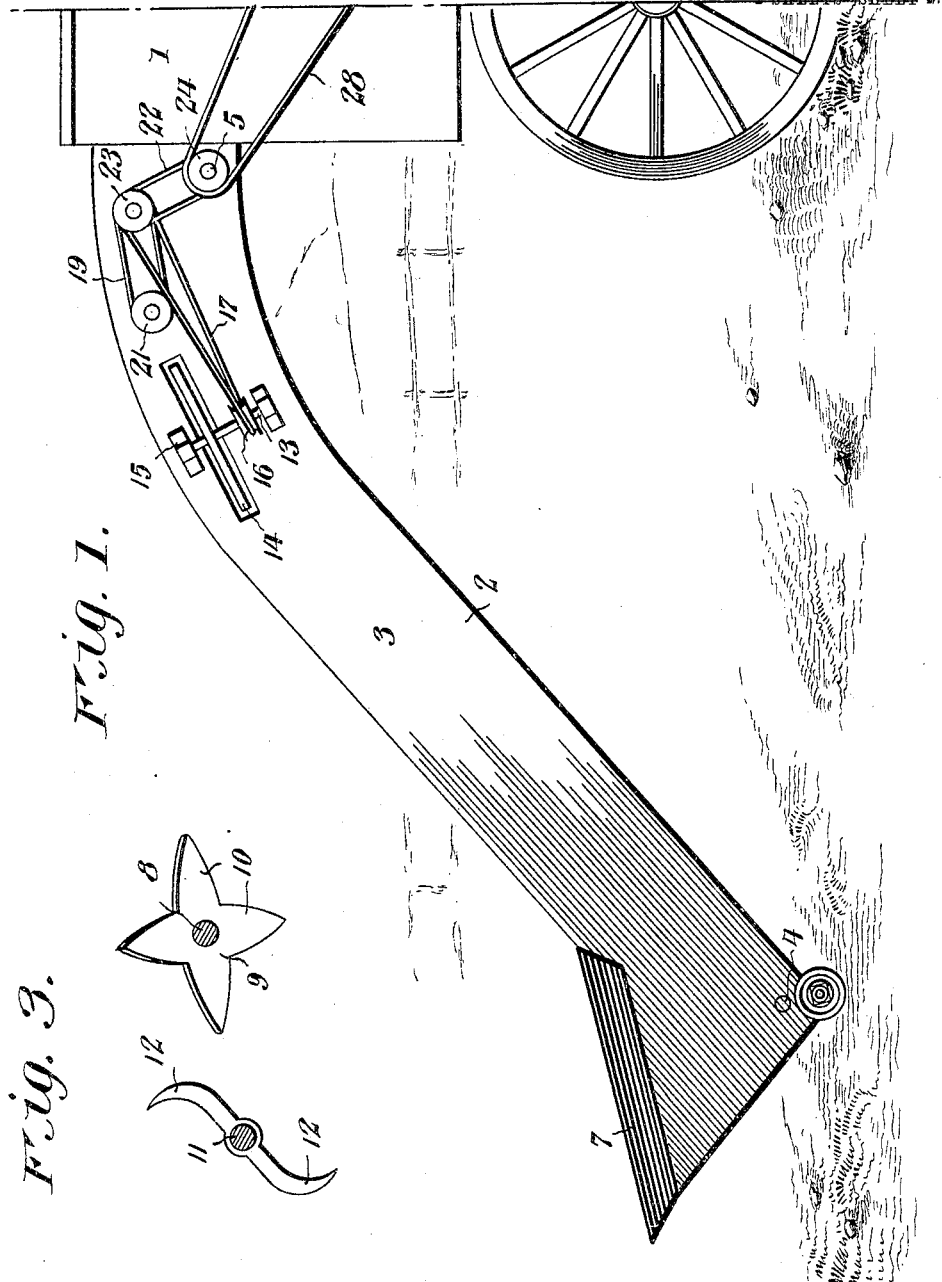
Figure 2:
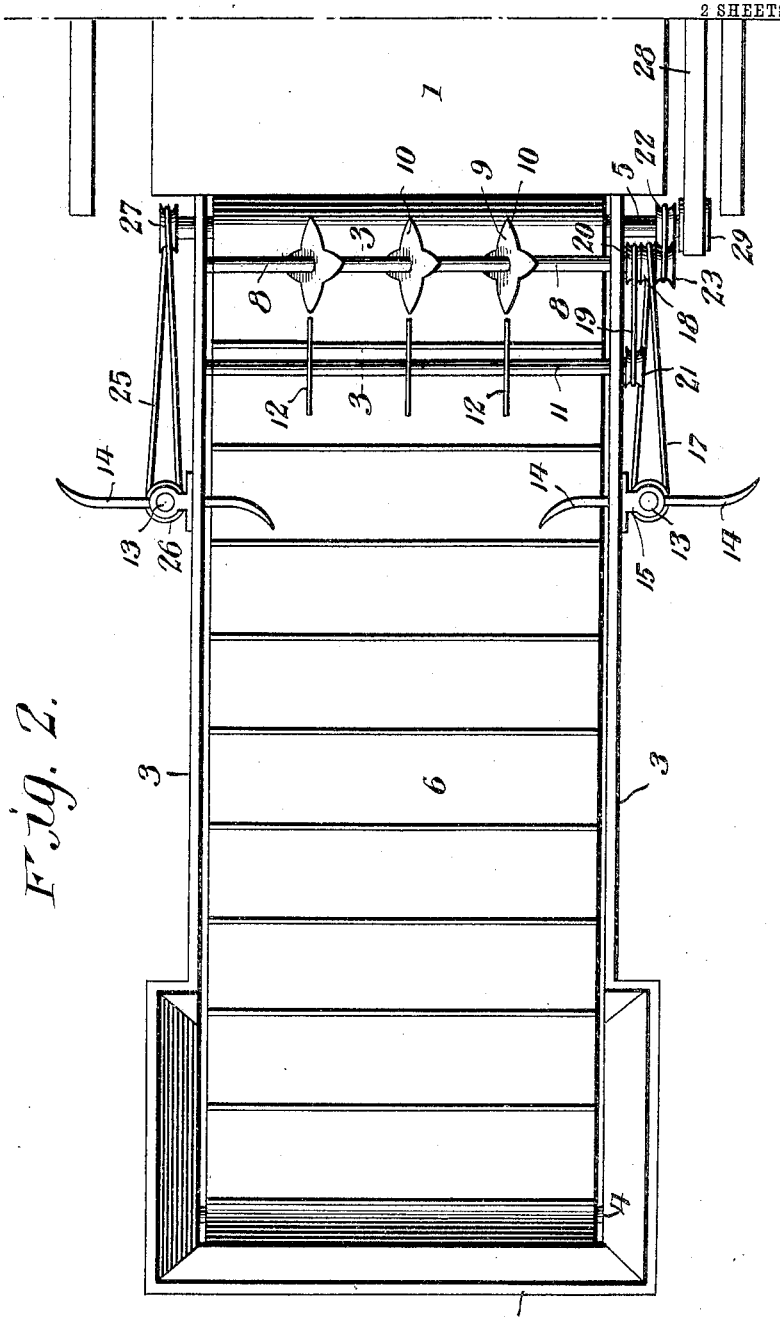

In the accompanying drawings, Figure 1 is a side elevation of a band-cutter and feeder embodying the present invention, showing also a portion of a threshing-machine to which the band-cutter as a whole is applied. Fig. 2 is a plan view of the same. Fig. 3 is an enlarged detail view of one of the band-cutters and one of the spreaders.

Like reference-numerals designate corresponding parts in all the figures of the drawings.

Referring to the drawings, 1 designates a sufficient portion of a threshing-machine to illustrate the application of the present invention thereto.

2 represents the frame of the band-cutter and feeder, which comprises, essentially, the sides 3, suitably connected and braced and provided with bearings at or near its opposite ends for the reception of the shafts 4 and 5 of the outer and inner rollers, upon and around which moves an endless slatted apron or conveyer 6, the upper side or run of which moves inward toward the threshing-machine and carries the bundles thereon.

At its outer end the frame of the feeder is expanded to form a flaring hopper 7, the bottom of which is formed by the endless conveyer or apron 6, said hopper being adapted to receive the bundles, which are thus deposited on the conveyer and carried inward toward the threshing mechanism. Adjacent to the inner end of the feeder-frame is a spreader-shaft 8, which extends transversely across the feeder above the conveyer 6 and has rigidly mounted thereon a series of spreaders 9, each of which is preferably in the form of a winged disk, as shown in Figs. 2 and 3, each spreader comprising a plurality of radially-projecting wings 10, while the spreader itself is set obliquely on or at an angle to the shaft 8, as clearly indicated in the plan, Fig. 2. As said spreaders are rotated by the shaft 8 a wabbling motion is imparted thereto, which causes the wings 10 to spread the grain just prior to its delivery to the threshing mechanism.

Just in advance of the shaft 8 is arranged a cutter-shaft 11, which extends parallel to the shaft 8 and is provided with a plurality of band-cutters or knives 12, each comprising oppositely-projecting portions curved in opposite directions, as shown in Fig. 3, and provided with convex cutting edges which in the rotation of the cutters act on the bands of the bundle and sever the same just before the bundles reach the spreaders.

Located in advance of the shaft 11 at each side of the feeder-frame are bundle-straighteners, each of which comprises a substantially vertical shaft 13, from which project in opposite directions arms 14, which constitute the bundle-straighteners and which are preferably curved in opposite directions, as shown in Fig. 2. Each of the shafts 13 is mounted in suitable bearings 15 on the machine-frame and is equipped with a drive-pulley 16, which derives its motion from a driving band or belt 17, which passes around a pulley 18 on the shaft 8. Another band 19 extends from a pulley 20 on the spreader-shaft 8 to and around a pulley 21 on the cutter-shaft 11, while another band 22 extends from a pulley 23 on the spreader-shaft around a pulley 24 on the shaft 5 of the inner roller of the endless apron or conveyer, all as clearly illustrated in Figs. 1 and 2. Another band 25 extends around a pulley 26 on the remaining bundle-straightener shaft 13 and around another pulley 27 on the end of the roller-shaft 5 opposite the pulley 24. In this way rotary motion is imparted to the several shafts 8, 11, and 13, thus imparting corresponding rotary motion to the spreaders, cutters, and bundle-straighteners.

As the bundles are carried inward toward the threshing mechanism by the endless apron or conveyer the bundle-straightening arms 14 act upon the bundles and serve to straighten the same or line them up, with the direction of their movement toward the threshing mechanism. The bundle-straighteners are arranged in such proximity to the band-cutters that said cutters act upon the bundles soon after they are straightened or lined up by the arms 14. This insures the proper action of the cutters on the bands of the bundles, and said bands are severed just before the bundle arrives in operative relation to the spreaders. The spreaders thereupon act upon the straw and serve to spread the same laterally across the full width of the endless apron or carrier, and in such spread-out and loose condition the grain is carried by the conveyer directly to the threshing mechanism and delivered to the action of the threshing-cylinder and concave. Motion may be imparted to the shaft 5 by means of a driving-belt 28 from any suitable shaft of the threshing-machine to a band-pulley 29, fast on said shaft 5. In practice the frame of the band-cutter and feeder will be detachably connected with the frame of the threshing-machine, so that the band-cutter and feeder as a whole may be folded upon the top of the threshing-machine for transportation and storage.

Having thus described the invention, what is claimed as new is—

In a band-cutter and feeder the combination of an upwardly-extending frame expanded at its lower end to form a flared hopper, the sides of said frame being slotted adjacent to the upper ends thereof, vertical shafts journaled on said sides adjacent to said slots and having oppositely-extending arms which are adapted to project through the slots to act as bundle-straighteners, an endless conveyer mounted in said frame and band-cutting and bundle-straightening means mounted in said frame.

In testimony whereof I affix my signature in presence of two witnesses.

ROBERT E. VAN COURT.

Witnesses:
JOE HORN,
W. H. LISTER.